United States Patent Office 3,248,787
Patented May 3, 1966

3,248,787
PROCESS FOR THE PRODUCTION OF A
GAS-DIFFUSION ELECTRODE
Heinz-Gunther Plust, Spreitenbach, and Carl Georg
Telschow, Zurich, Switzerland, assignors to Aktiengesellschaft Brown, Boveri & Cie, Baden, Switzerland,
a joint-stock company
No Drawing. Filed Jan. 17, 1963, Ser. No. 252,021
Claims priority, application Switzerland, Jan. 19, 1962,
630/62
7 Claims. (Cl. 29—420)

The invention relates to a process for the production of a gas-diffusion electrode, more particularly for fuel elements.

For producing gas-diffusion electrodes, it is known to use a granular starting material, to which the desired shape is first of all imparted by pressing and sintering. In this connection, a Raney alloy is used as the starting material, and attains its highly effective activity after pressing by having one metallic component dissolved out. Moreover, dissolving out considerably reduces the mechanical strength of the member, so that it is no longer capable of fulfilling to the desired degree the task of acting as a separator between the gas and liquid spaces.

A double-skeleton catalyst electrode has been proposed in order to avoid this disadvantage, consisting of a metal conductive skeleton serving as a carrier with grains of Raney metal incorporated therewith, the material which serves as a carrier and the Raney metal having been finely powdered, pressed, sintered and finally treated with lyes. The metal conductive skeleton is, for example, made of nickel, while the grains of Raney metal are grains of Raney nickel. Such an electrode has the disadvantage that the catalytically active electrode material, namely the grains of Raney metal present after the lye treatment, are necessarily confined to a part only of the whole electrode, namely a third to a half. Likewise, mechanical strength is imparted to the electrode by the metal conductive skeleton of only part of the whole electrode material. In addition, the process for the production of a double-skeleton catalyst electrode is relatively complicated, since one starting material, the grains of Raney alloy, must first of all be produced in a special part of the process involving melting two metals, and cutting, crushing and milling the alloy. Finally, difficulties are involved in sifting the Raney alloy according to the desired range of grain sizes, since Raney alloy is precipitated in very irregular and uneven form because of its brittle nature.

The invention circumvents the disadvantages mentioned. The process for the production of a gas-diffusion electrode, more particularly for fuel elements, is characterized in that a porous electrode member is produced by pressing and sintering a catalytically active metal powder of at least substantially uniform grain size, a layer of a catalytically inactive metal is then applied to and alloyed into the inner pore surfaces of the member, and finally the catalytically inactive material is dissolved out.

As opposed to known gas-diffusion electrodes and processes for producing them, the new process and the electrode produced thereby have the advantage that the whole inner pore surface of the electrode member is catalytically highly active, so that a greater electrochemical load can be carried. A further advantage resides in that mechanical strength is imparted by the whole electrode material, with the result that for a given gas-pressure the layer thickness of the electrode may be made smaller than in the case of known electrodes. Thus, the element has a smaller specific volume when an electrode produced by the process according to the invention is used in a fuel element. Finally, the process completely avoids the difficult operation of sifting Raney alloy.

An expedient way of carrying out the process resides in exposing a stable electrode member formed by pressing and sintering a catalytically active metal powder to a gaseous organic compound of a catalytically inactive metal, and thermally decomposing this organic metal compound on the inner pore surfaces of the electrode member. The catalytically inactive metal deposits on the pore surfaces, then is alloyed into the electrode member in a controlled diffusion procedure. Since the gaseous decomposition products liberated upon thermal decomposition of the organic metal compound do not have any oxidizing action either on the metal of the electrode member or on the dissociated metal, no layer of oxide which would hinder wetting can appear between the surfaces of the electrode member and the applied layer of metal. The diffusion procedure accordingly need not be carried out in a reducing atmosphere. The Raney alloy formed over the whole inner pore surface of the electrode member is finally activated in known manner by treatment with lyes.

The catalytically active metals—nickel, cobalt and iron and even silver, are suitable for producing the electrode member. Known gaseous organic compounds of aluminium, silicon, magnesium and zinc are used for producing the Raney alloy on the inner surfaces of the electrode member. It has provide to be advantageous to apply a layer of alloy to an electrode member pressed and sintered from nickel or silver powder, application being by thermal decomposition of an organic aluminium compound such as aluminium triethyl, aluminium tripropyl, aluminium tri-iso-propyl, aluminium tributyl or aluminium tri-iso-butyl.

In order to attain uniform deposition of the catalytically inactive metal, it is advantageous to pass the gaseous organic metal compound into the electrode member alternately from both sides. If the gaseous compound is fed into one side only, the layer of catalytically inactive metal will be thicker on this side than on the opposite side, the thickness of metal decreasing continuously from one side to the other side. On the other hand, this effect, which is undesirable in the production of a homoporous electrode member, may be put to use in an advantageous application of the process. In the controlled diffusion procedure, a layer of alloy is formed of the metal of the electrode member and the metal dissociated from the organic compound, and this layer of alloy increases in thickness as the thickness of the layer of dissociated metal increases. In the subsequent activation, by which the catalytically inactive metal is dissolved out of the layer of alloy, a larger quantity of material is accordingly removed at those points where the alloy is thicker. The consequence of this is that the pores are of greater diameter than on that side of the electrode on which the dissociated layer of metal, and thus the layer of alloy, was thinner. An electrode is thus obtained with pore diameter increasing in one direction, and exhibiting the properties of a multi-layer electrode, while at the same time being simple to produce and having a maximum active surface and great mechanical strength.

A further example of carrying out the process according to the invention resides in mixing the catalytically inactive metal with the catalytically active metal powder, the mean grain diameter and the quantity of inactive metal being smaller than those of the active metal. The mixture is thereupon pressed and sintered at a temperature below the melting point of the inactive metal. Because of their smaller size and quantity, the grains of inactive metal are incorporated into the skeleton of grains of active metal in such a way that grains of active metal are everywhere in contact with one another. Since the sintering temperature is lower than the melting point of the inactive metal, it is furthermore impossible for any alloy which would impair mechanical strength to form at the points of contact between the active metal grains. After sintering, the rigid electrode member is heated to a temperature above the melting point of the inactive metal, so that the latter melts and wets the inner pore surfaces of the electrode member formed by the active metal grains. After the layer of metal formed has been alloyed into the electrode member, the inner pore surfaces are finally activated by dissolving out the inactive components of the layers of alloy with lyes.

In order to prevent a skin of oxide on the inactive metal grains from impairing wetting of the inner pore surfaces of the electrode member, it is advantageous to coat these surfaces, before mixing, pressing and sintering, with a thin layer of an oxide-solvent flux. This is done, for example, by rinsing the catalytically inactive metal grains with an aqueous solution of a flux and then drying. Sintering temperature is kept below the melting point of the flux. After the electrode has become rigid, the temperature is raised to a value above the melting point of the flux. Upon melting, the oxide layer of inactive metal, which is present in liquid form, is removed, so that the metal, being well wetted, can react with the inner pore surfaces of the electrode member.

If nickel powder and aluminium powder are used as starting materials, it has proved to be expedient to rinse the aluminum grains with an aqueous solution of a flux consisting of 15% sodium-aluminium fluoride, 60% sodium chloride and 25% potassium chloride.

*Example 1*

Nickel powder with an average grain diameter of 20 to 60$\mu$ is pressed in a mold at 1000 to 3000 kg./cm.$^2$ to a circular disc, and sintered in a reducing atmosphere at about 550 to 750° C. for 30 to 120 minutes. The disc is introduced into the middle of a cylindrical tube provided with gas connections on both sides, and divides the said tube into two gas-spaces. The disc is externally heated to 200° to 250° C. A gas made up of hydrogen and 1 to 10% aluminium tri-iso-butyl is alternately introduced into the gas-spaces through the two gas connections for 10 minutes each at a velocity of 1 litre per minute, until it is stopped from flowing through because the pores become blocked by the dissociated aluminium. The disc is then heated in the same tube in an atmosphere of hydrogen to 725°, and kept at this temperature for 15 minutes. The disc is then cooled to 635° with a temperature gradient of 2° per minute, rapid cooling may be effected thereafter. The electrode taken from the tube is finally activated by treatment with a concentrated potassium lye at a temperature rising from 20 to 80° C.

*Example 2*

Aluminium powder is rinsed with an aqueous solution of a flux consisting of 15% sodium-aluminium fluoride, 60% sodium chloride and 25% potassium chloride, and then dried. The grains are sieved out in a range of size from 5 to 30$\mu$, and well mixed with nickel powder having an average grain size of 20 to 80$\mu$ in a ratio of 1:10 by weight. The mixture is pressed in a mold at 1000 to 3000 kg./cm.$^2$, and sintered for about 45 minutes in a reducing atmosphere at 640° C. The temperature is then raised to 725° C. with a gradient of 5° per minute, and maintained for 15 minutes. The electrode is then cooled to 635° C. with a temperature gradient of 2° per minute; rapid cooling may be effected thereafter. The electrode is finally activated by treatment with 7% potassium lye at 40° C. for one hour, and subsequent treatment with concentrated potassium lye at a temperature rising from 20 to 80° C.

We claim:
1. Process for the production of a gas-diffusion porous electrode which comprises forming an electrode member by pressing and sintereing a catalytically active metal powder of substantially uniform grain size, applying a layer of a catalytically inactive metal to and partially alloying it into the inner pore surfaces of the member, and finally treating the electrode member with an agent adapted to dissolve the inactive metal.

2. Process according to claim 1, in which the layer of catalytically inactive metal is formed on the inner pore surfaces of the electrode member by exposing the electrode member to a gaseous organic compound of a catalytically inactive metal, thermally decomposing said compound on said surfaces into metal and gaseous products, and alloying the metal layer so formed into the member.

3. Process according to claim 2 in which a large-surface electrode member is exposed predominantly on one side only to a gaseous organic compound of a catalytically inactive metal.

4. Process according to claim 1, in which the inner pore surfaces of an electrode member formed by pressing and sintering nickel powder are exposed to a gaseous organic aluminium compound.

5. Process according to claim 1 in which a catalytically inactive metal powder of smaller average grain size is mixed in relatively smaller quantity with the catalytically active metal powder, the mixture is pressed and sintered at a temperature below the melting point of the catalytically inactive metal, and the layer of catalytically inactive metal is applied by raising the temperature to a value above the melting point of the catalytically inactive metal, and the latter is alloyed into the catalytically active metal.

6. Process according to claim 5, in which the catalytically inactive metal powder is coated before pressing with a thin layer of an oxide-solvent flux, sintering is carried out at a temperature below the melting point of the flux, and the temperature is then raised to a value above the melting point of the flux and the catalytically inactive metal.

7. Process according to claim 6, in which nickel powder is mixed and pressed with aluminium powder which is rinsed with an aqueous solution of a flux consisting of 15% sodium-aluminium fluoride, 60% sodium chloride and 25% potassium chloride and then dried, and sintering is carried out at a temperature below 700° C.

References Cited by the Examiner
UNITED STATES PATENTS

| | | | |
|---|---|---|---|
| 2,860,175 | 11/1958 | Justi | 74—222 XR |
| 3,050,386 | 8/1962 | Von Donren et al. | 75—222 XR |
| 3,150,011 | 9/1964 | Winsel et al. | 136—120 |

FOREIGN PATENTS 210,729  4/1956  Australia.

JOHN F. CAMPBELL, *Primary Examiner.*

WHITMORE A. WILTZ, J. C. HOLMAN, P. M. COHEN, *Examiners.*